UNITED STATES PATENT OFFICE.

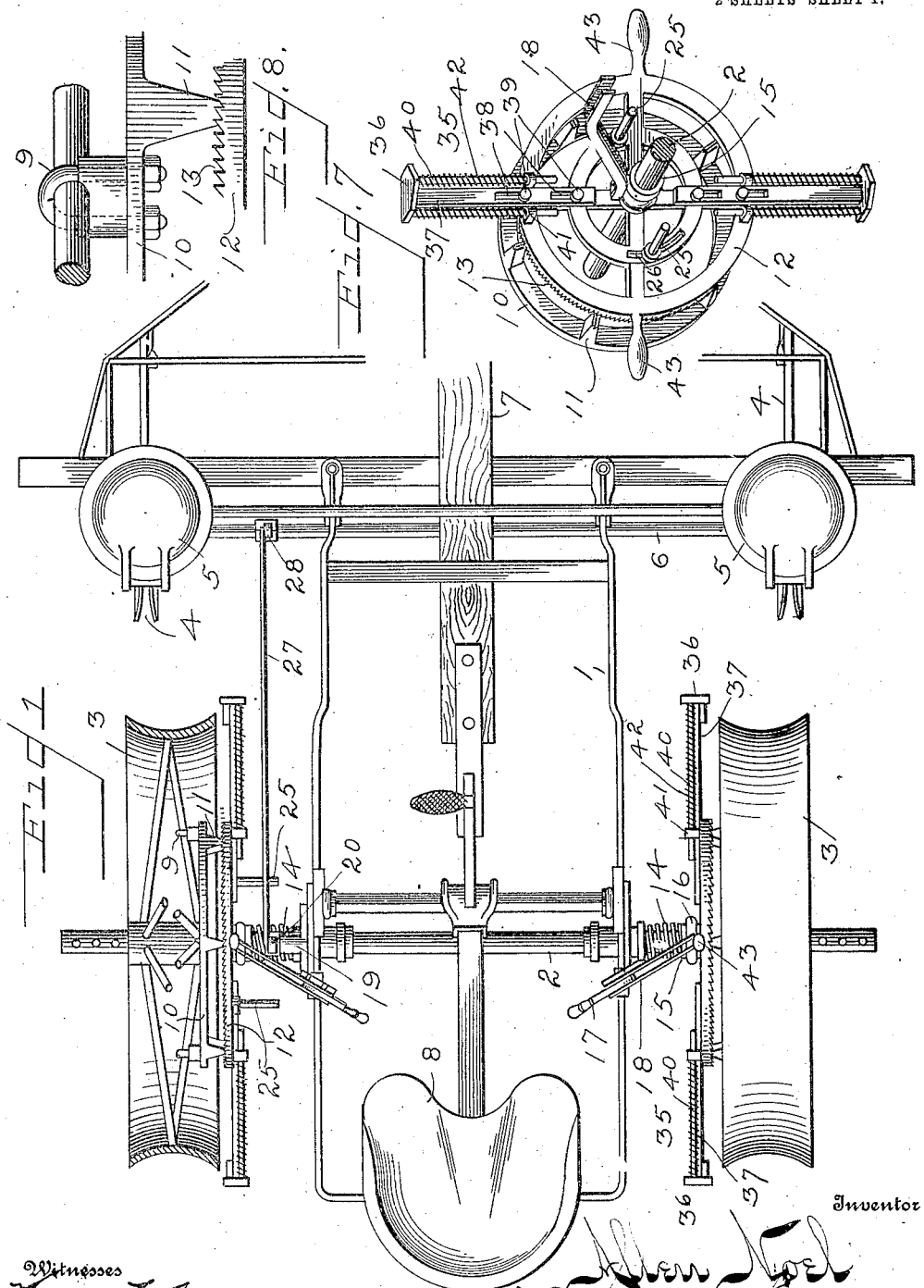

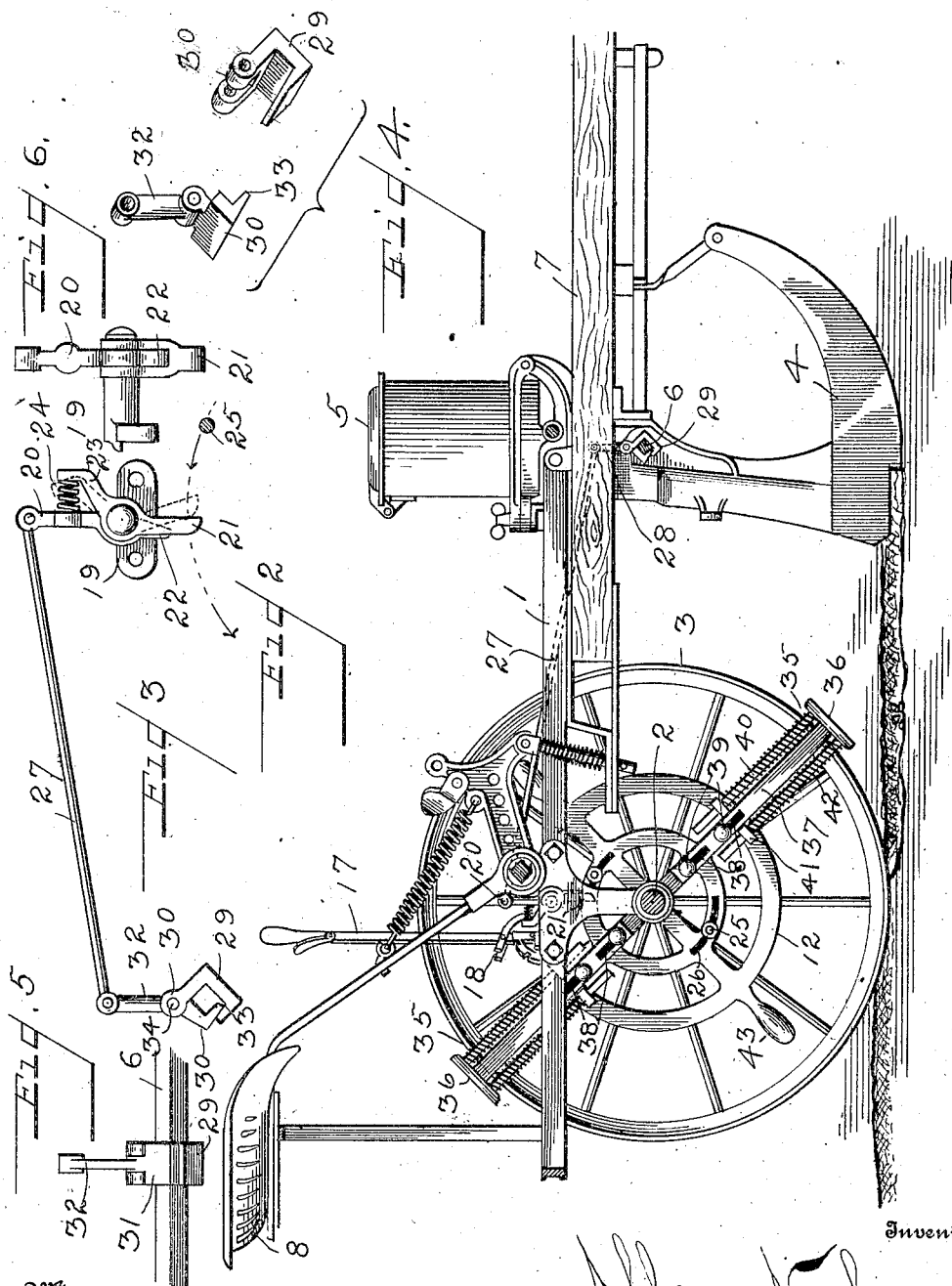

ALLEN NOEL, OF SPRINGFIELD, OHIO.

CORN-PLANTER.

1,097,351.   Specification of Letters Patent.   Patented May 19, 1914.

Application filed December 17, 1910. Serial No. 597,855.

*To all whom it may concern:*

Be it known that I, ALLEN NOEL, a citizen of the United States, residing at Springfield, in the county of Clark and State of Ohio, have invented certain new and useful Improvements in Corn-Planters, of which the following is a specification.

My invention relates to corn planters and particularly to check row and tripping mechanism therefor.

It is customary to employ in combination with corn planters a wire or cable which extends across the field to be planted and which is provided at regular intervals with knots or projections which by engaging with the trip mechanism of the seed feeding devices as the machine is driven across the field in proximity to said cable, thereby cause the seed to be deposited at regular intervals. It is necessary for the operator to shift the cable each time the machine traverses the field, and the strain upon the cable and the slack in the cable resulting from the strain permits the machine to gain or drop the seed a little in advance of the positions of the preceding row, and therefore the seed deposits of succeeding rows will not always register. Furthermore while the operator can determine the position of the preceding rows, he is unable to determine at what points in such rows the seed was dropped, and is therefore unable to correct such variation or error.

The object of the present invention is to provide means for operating the seed dropping mechanism at regular intervals and for marking the position of the seed deposit whereby the operator may definitely determine the relation of the seed deposits of succeeding rows, and correct any variation in the registry of such deposits, and to provide means for adjusting the marking and tripping devices in relation to the carrying wheels of the machine whereby any variation of registry of the seed deposits of succeeding rows may be corrected.

Further objects of the invention are to simplify the structure as well as the means and mode of operation of such devices, whereby they will not only be cheapened in construction, but will be more positive and efficient in action, accurate, easily operated and readily adjusted, and unlikely to get out of repair.

With the above primary and other incidental objects in view as will more fully appear in the specification, the invention consists of the features of construction, the parts and combination thereof, and the mode of operation or their equivalents, as hereinafter described, and set forth in the claims.

Referring to the drawings, Figure 1 is a top plan view of a corn planter with the attachments forming the subject matter hereof, mounted thereon. Fig. 2 is a longitudinal sectional view, or an elevation of the inner side of one of the carrying wheels viewed from the central portion of the machine. Fig. 3 is a detail view of the two part trip lever, the detachable rock arm of the dropper shaft, and their connecting link. Figs. 4 and 5 are detail views of the detachable rock arm. Fig. 6 is a detail view of the two part trip lever the view being at a right angle to that of Fig. 3. Fig. 7 is a detail perspective view of the tripping and marking devices. Fig. 8 is a detail view of the means for attaching the parts to the carrying wheels.

In the drawings there is shown a corn planter of popular style comprising the frame parts 1, and the axle 2, upon which are journaled the carrying wheels 3. Supported on the forward portion of the machine are the runners or shoes 4 by which the furrows are opened in which the corn is dropped. Located above the shoes 4 are the grain hoppers 5 in the lower parts of which is located the feeding or dropping mechanism, operated by an oscillatory movement of the rock or dropper shaft 6. Extending forward from the frame is the usual tongue 7, by which the machine is guided and to which the horses are hitched to draw the machine, while at the rear central portion of the frame is located the operator's seat 8.

As thus far described the machine is of the ordinary type of planter now in common use, and forms no part of the present invention. The attachment forming the subject matter hereof is adapted to be attached to any machine of this type, whether constructed exactly as shown or otherwise. Furthermore the mechanism to be described may be applied to a machine already constructed or in use, or it may be built into the machine at the time of its construction and become an integral part thereof.

Rigidly secured upon the inner sides of the carrying wheels 3 preferably by clevises 9 engaging about the spokes of the wheel is an annular ring 10, having a plurality of projecting lugs or bosses 11. The ring 10 is supported on suitable space blocks (see Figs. 1 and 8) or it may be bolted or otherwise secured direct to the wheel. Mounted on the axle 2 adjacent to the inner side of the carrying wheel, and both revolubly and slidingly movable upon the axle 2 is an annular member 12, having in the outer side thereof, or the side adjacent to the ring 10 a series of serrations or teeth 13. These teeth as shown in the drawings are all inclined or beveled in one direction, and engage corresponding teeth or serrations in the extremities of the lugs 11. A helical spring 14 on the axle 2 tends to force the annular member outward or into engagement with the lugs 11 of the ring 10. The interengagement of the serrations 13 of the annular member 12 with those of the lugs 11 forms a clutch whereby the annular member 12 is caused to rotate with the carrying wheel 3. The inclined formation of the interengaging teeth however permits the annular member to be adjusted in relation to the carrying wheel through a revoluble movement in a forward direction. The annular member 12 is provided with an inwardly projecting hub 15 having a peripheral groove therein in which is mounted a collar 16. An operating lever 17 is pivoted on the main frame in proximity to the operator's seat 8 and is connected by links 18 with the collar 16. The construction is such that by the operation of the lever 17 the annular member may be drawn inward against the tension of the spring 14, and the serrations 13 thereof disengaged from those of the lugs 11, thereby permitting the carrying wheel to rotate independent of the annular member 12.

Supported on a suitable bracket 19 mounted on the main frame 1 is a pivoted trip lever comprising an upward extending arm 20 and a pendant arm 21. The upper arm 20 has a lug 22 extending below the pivotal point and bearing on the lower or pendant arm 21. The pendant member 21 has an auxiliary arm 23 extending above the pivotal connection, and a spring 24 is interposed between the said auxiliary arm 23 and the upward extending arm 20. The construction is such that when the pendant arm 21 is contacted and moved in one direction, as indicated by the arrows in Fig. 3, the upper arm 20 through the engagement of the lug 22 will be moved in unison therewith. However upon a contact and oscillation of the pendant member 21 in the opposite direction (opposite that indicated by the arrows) the pendant member will move independent of the upper arm 20 against the tension of the spring 24, as indicated by dotted lines in Fig. 3. The pendant portion 21 of the trip lever, when said lever is in position on the machine as shown in Fig. 2, projects into the path of one or more studs 25 carried by the annular member 12. The studs 25 are preferably engaged in arcuate slots 26 in the annular member 12, within the limits of which the said studs are adjustable to compensate for variations in the manufacture of the parts and to permit the proper timing of the operations. At each rotation of the carrying wheel each of the studs carried by the annular member 12 engages the pendant arm 21 and oscillates the trip lever, which movement is transmitted through a connecting rod 27 and rock arm 28 to the rock or dropper shaft 6. Upon a rearward movement of the carrying wheels such as in backing the machine, or in turning, the studs 25 engage the pendant arm 21, but the said pendant arm yields against the tension of the spring 24, thus breaking the trip lever and permitting the stud to pass without affecting the upper arm 20 or operating the rock or dropper shaft 6.

To permit the attachment to be readily applied to or removed from machines already in use without the necessity of dismantling the machine the rock arm 28 is formed in two separable pieces. As shown in the drawings the rock or dropper shaft is square in cross section, and the rock arm 28 is made to fit the said shaft. It is to be understood that the arm may be made to fit a shaft of any size or shape. As shown particularly in Fig. 4, the rock arm comprises a U shaped member 29 adapted to extend on three sides of the shaft 6, and provided with alined ears 30, and a right angle portion 31 formed integral with the arm 32, the nose 33 of the right angle member being adapted to extend within the U shaped portion, and the arm 32 between the ears 30 where it is secured by a pin or stud 34. By withdrawing the connecting pin 34 the parts of the rock arm may be disconnected and the arm readily removed from the dropper shaft.

Radially mounted on the annular member 12 are one or more spring actuated presser feet or spuds 35. These spuds each comprise a head 36 carried on a sliding bar 37 movable in a radial direction, and projecting beyond the periphery of the carrying wheel 3. The radial bars 37 may be mounted in any suitable keepers or slides on the member 12, but are preferably slotted as at 38 and engage studs or bolts 39 by which their movement is limited. Attached to the head 36 and located on either side of the bar 37 are rods 40 sliding in guides 41 on the annular member 12. Mounted on the rods 40 are springs 42, bearing at one end on the head 36 and at the other in the guides 41 and thereby tending to force the spuds outward or radially away from the axle 2. At each rotation of the carrying wheel 3, the spuds carried on the corresponding annular member 12 will engage the ground, and while said spuds will yield against the tension of the springs 42, they will leave an imprint or mark in the soil adjacent to the wheel track. It is to be understood that planters of this type are so constructed that the seed hoppers 5 and the carrying wheels 3 are adjustable to and from each other as indicated by the series of holes in either end of the axle 2 outside the carrying wheels 3, to provide for different spacing between the rows of planted seed. As shown in Fig. 1 the wheels and spuds are adjusted inward out of registry with the line of planting. Either the hoppers may be adjusted inward or the wheels 3 outward to bring either the carrying wheels or the spuds as may be desired in line with the furrow shoes 4.

The construction is such that at each oscillation of the trip lever through the engagement therewith of the stud 25 the dropper shaft is operated to cause the deposit of a planting of seed through the shoe 4, which is somewhat in advance of the carrying wheel 3 and spuds. The spuds are so located on the annular member 12 in relation to the studs 25, through the relative adjustment of the studs 25 in the arcuate slots 26, that as the machine moves forward the spud will engage the ground at a point corresponding to the deposit of the seed, and by leaving an imprint of the spud head 36 will definitely mark the point of deposit. Either the carrying wheels may be employed for covering the deposited seed, and the spud employed merely to mark the point by an impression adjacent to the wheel track, or the wheel 3 may be adjusted outward to bring the spuds in alinement with the furrow shoes 4, in which case the spud will bear directly upon the spot where the seed was previously deposited, thus serving to cover the seed, and pack the soil there about, which in some kinds of soil is quite desirable. Thus the spud is made to serve a double purpose, that of marking the point of deposit, and that of covering the seed and packing the soil there about.

Without the use of the spuds and checking by a knotted cable in the usual manner, the operator has only the wheel tracks to guide him, such tracks indicating the rows of planting in one direction only. There is no indication of the point of deposit of the seed by which he can cross check to correct any error in the planting to insure straight rows in either direction. However by the construction hereinbefore described, the seed is deposited at regular measured intervals without the use of a cable, and regardless of the length of the rows or width of the field, or the unevenness of the ground, and the point of deposit is automatically and accurately marked by a visible imprint enabling the operator to cross check the rows and insures alinement of the planting in either direction. With the use of the usual cable rows cannot be planted continuously across an extremely wide field, but the length of the row is limited to that of the cable. The planting of a wide field must be done in sections according to the length of the cable, whereas with the present attachment the length of row is unlimited. Furthermore in planting uneven ground where a deep valley or high hill intervenes between the ends of the rows the cable either extends at undue height above the surface in the case of the valley, or drags tightly on the ground in the case of the hill, and in either case will effect a variation in the operation of the planter. With the present attachment the space intervals are measured along the surface of the ground and on each arc of undulation and not on the geometrical chord of such undulations or on a level considerably above the surface of the ground.

Projecting radially from the annular member 12 are handles 43 by which the member 12 may be revolubly adjusted on the axle to bring the stud 25 in proper relation to the trip lever to operate the mechanism at a predetermined point in the travel of the machine, particularly at the beginning of a row in order that all rows may be started evenly, or to correct any unalinement of the seed deposit points as indicated by the imprint of the spuds.

Annular members 12, with their spuds 36—37 and disengaging levers 17 are provided at each side of the machine, the members 12 being carried by both the carrying wheels. However the trip studs 25 and trip lever and connections are required only on one side of the machine.

From the above description it will be apparent that there is thus provided a machine of the character described, possessing the particular features of advantage before enumerated as desirable, without departing from the principle involved, or sacrificing any of its advantages.

Having thus described my invention I claim:

1. In a seeding machine, a main frame, carrying wheels, seed feeding mechanism, a revoluble member loosely journaled on the axle of the carrying wheels and adjustable both revolubly and laterally thereon independent of the wheels, a series of teeth carried by the revoluble member, a concentric notched rim detachably secured to the spokes of the adjacent carrying wheel, with which the removable member is engaged and disengaged by its lateral adjustment, an operating lever adapted to control the lateral adjustment of the revoluble member, independent of its revoluble adjustment, a handle independent of the lever for controlling the member independent of the carrying wheels, a marking spud and a trip finger adapted to operate the seed feeding mechanism both carried by the revoluble member.

2. In a seeding machine, a main frame, carrying wheels, seed feeding mechanism, a revoluble member loosely journaled on the axle of the carrying wheels and adapted to be detachably engaged with the adjacent carrying wheel, a radially disposed arm slidingly engaged with the revoluble member and adjustable in a radial direction, a marking head carried by the arm, parallel rods located on opposite sides of the arm rigidly secured to the head and having bearings in the revoluble member in which said rods reciprocate, and helical springs surrounding the rods and interposed between the head and bearings.

3. The combination with a main frame, carrying wheels, and seed feeding mechanism, of an oscillatory shaft adapted to operate the seed feeding mechanism, a trip lever mounted on the frame, a stud carried by the carrying wheel into the path of which the lever projects, a link connected at one end to the trip lever, a detachable rock arm on the oscillatory shaft to which the opposite end of said link is connected, comprising a substantially U-shaped member within the bight of which the oscillatory shaft is engaged, an L-shaped member also bearing on the shaft and having one end thereof engaged within the extremity of the U-shaped member, the opposite extremities of the L and U-shaped members being connected together, and an arm projecting from one of said members.

In testimony whereof, I have hereunto set my hand this 10th day of December 1910.

ALLEN NOEL.

Witnesses:
 FLOYD A. JOHNSTON,
 F. L. WALKER.